United States Patent Office.

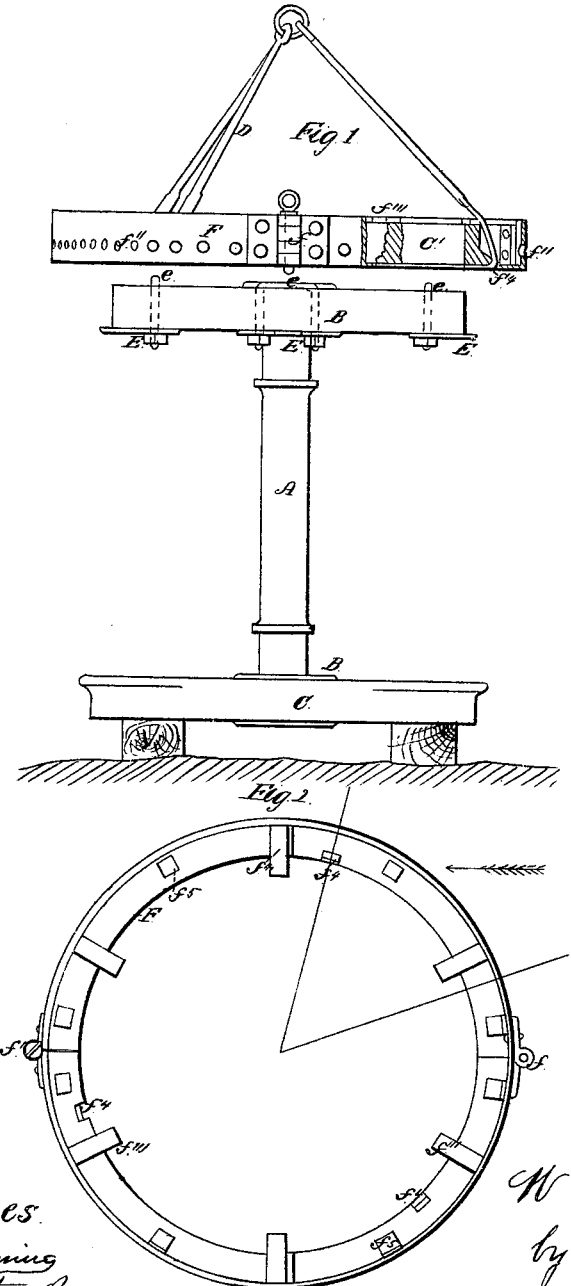

W. BELL SMITH, OF CHARLESTON, SOUTH CAROLINA.

Letters Patent No. 91,279, dated June 15, 1869.

IMPROVED PORTABLE FURNACE FOR SHRINKING ON AND REMOVING TIRES.

The Schedule referred to in these Letters Patent and making part of the same.

*To all whom it may concern:*

Be it known that I, W. BELL SMITH, of Charleston, in the district of Charleston, and State of South Carolina, have invented a new and useful Improved Portable Furnace for Shrinking on and Removing Tires; and I do hereby declare the following to be a full, clear, and exact description of the same, reference being had to the accompanying drawings, which form part of this specification.

Prior to my invention the shrinking on of the tires especially of locomotive-wheels, has been attended with trouble and expense, owing principally to the necessity, by the known means, of removing the tire from the furnace in which heated, to place it on the wheel, the time involved in which operation often resulting in the tire cooling, so as to "stick" before reaching its destination, thus requiring it to be reheated.

The removal of tires for renewal, &c., has also been attended with serious difficulties, the entire wheel being necessarily subjected to the action of the heat required to expand the tire, in the one case, and immense expenditure of time, besides fuel and labor, being involved in the slow process of heating a portion of the circumference of the tire at a time.

To obviate these difficulties, and to provide a cheap, simple, easy, certain, and expeditious method of shrinking on and removing tires, is the object of my invention, which consists in the employment or use of a portable furnace, adapted to be so applied to the tire as to equally, or otherwise, as desired, and to a sufficient extent heat the same, and also to remain in place while the tire is being adjusted to place or removed.

In the drawings—

Figure 1 represents an elevation of my improved furnace, applied to a locomotive-tire, and of the devices employed to supend the tire and furnace, and of an axle and wheels ready to receive said tire, portions of the two former being broken away to more fully expose their construction.

Figure 2 is a plan view of the furnace, detached. The red line in said figure indicates the portion broken away in fig. 1, and the arrow, the direction of the view represented by said figure.

A, fig. 1, may represent a locomotive-axle;
B B', its wheels; and
C C', the tires of said wheels.

The tire C is represented in place on its wheel B and C', suspended over its wheel B' by means of hooks or grapples D, from a crane.

The wheels, to secure the correct adjustment of the tires, are provided with the usual gauge-plates E, which are secured by staples $e$ passing around the spokes of the wheel, and removed, after the tire is in place, in the customary manner.

The tires, to expand them, so as to enable them to be slipped on the wheels, and to retain them in this condition after being suspended, or previously, have applied to them, as represented in fig. 1, a furnace, F, which constitutes the subject of my invention, and which is adapted, by the construction hereinafter specified, or other substantially the same, to embrace the entire periphery of the tire, and subject it equally, or otherwise, as desired, to the action of the fire contained therein, and to permit the requisite expansion of the tire, and to remain on the tire until it is in place, or as long as desired, and to be readily and expeditiously applied and removed.

The furnace F is preferably made of sheet-iron, and is constructed in three or more sections, hinged together, as shown at $f$, and held closed by a latch, $f'$, which may be in the form of a hinge, with a removable pin or bolt, as shown, or of other suitable form.

The furnace is annular in form, so as to embrace the tire, and is preferably constructed without any inner wall or top, as shown.

Its vertical wall, or "sides," may be perforated, near the bottom, with a number of small holes, $f''$, for the admission of air to support combustion, or provision otherwise made for that purpose.

It is supported on the tire by means of brackets, $f'''$, resting on its upper side, when in the position shown in fig. 1, as represented in said figure, or other suitable means, its bottom or flange being adapted to project under the tire, as shown in said figure, or otherwise adapted to permit of the expansion of the tire, or its own expansion may be depended on for that purpose.

Its bottom, or flange, may further be notched, as represented at $f^4$, to admit of, or facilitate the insertion of the grapples D.

It may, when constructed of sheet-iron, as stated, be strengthened by braces or stays $f^5$.

The furnace being applied to the tire, as described, it is filled with charcoal, or other suitable fuel, which, being ignited, generates heat, and imparting it to the tire, expands the same.

The tire being sufficiently expanded, is then adjusted on to the wheel, or removed therefrom, as the case may be, the furnace remaining attached in either case, and keeping up the heat until the operation is completed, so as to prevent "sticking."

The furnace then being removed, the tire cools and shrinks, thus, in the case of its insertion, locking it securely in place.

The heat being applied from the outside, the operation of removing tires may be performed without heating the wheels much above "blood-heat."

Although my invention is primarily intended for shrinking on and removing locomotive-tires, it may also be employed for wagon and other tires, and bands of other descriptions, which are secured in place by shrinking, or may be removed by expanding.

Having thus described my invention,

I claim as new therein, and desire to secure by Letters Patent—

The furnace F, adapted to be applied circumferentially of the tire, and to remain attached thereto during the entire operation of adjusting in place or removing, substantially as and for the purposes set forth.

To the above specification of my improvement in portable furnaces for shrinking on and removing tires I have signed my hand, this 6th day of March, 1869.

W. BELL SMITH.

Witnesses:
N. H. LEBBY,
JOHN B. SHIRER.